March 29, 1927.
W. HUCKS
1,623,011
APPARATUS FOR AERATING LIQUIDS
Filed July 14, 1926    4 Sheets-Sheet 1
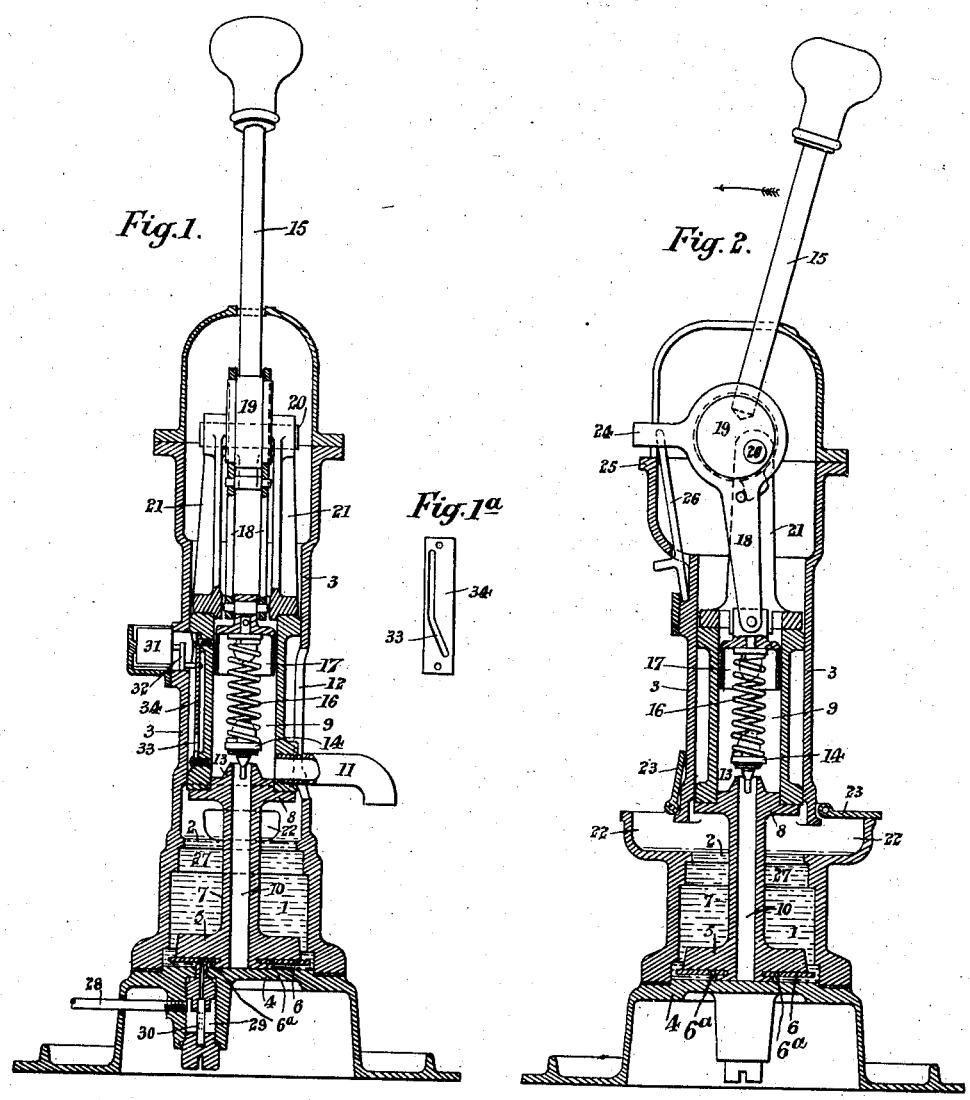
INVENTOR
WILLIAM HUCKS
BY HIS ATTORNEYS March 29, 1927. 1,623,011
W. HUCKS
APPARATUS FOR AERATING LIQUIDS
Filed July 14, 1926     4 Sheets-Sheet 2

INVENTOR
WILLIAM HUCKS
BY HIS ATTORNEYS

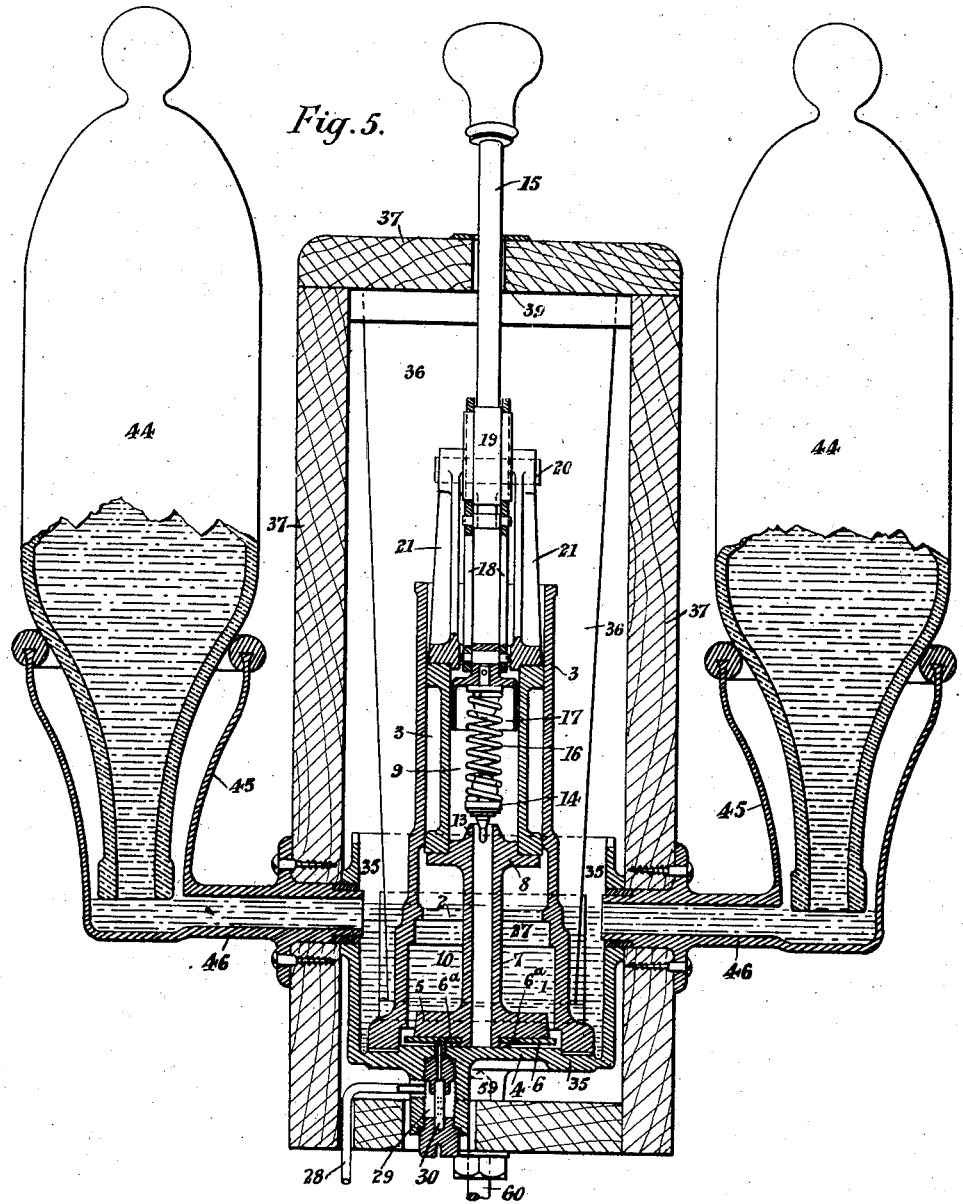

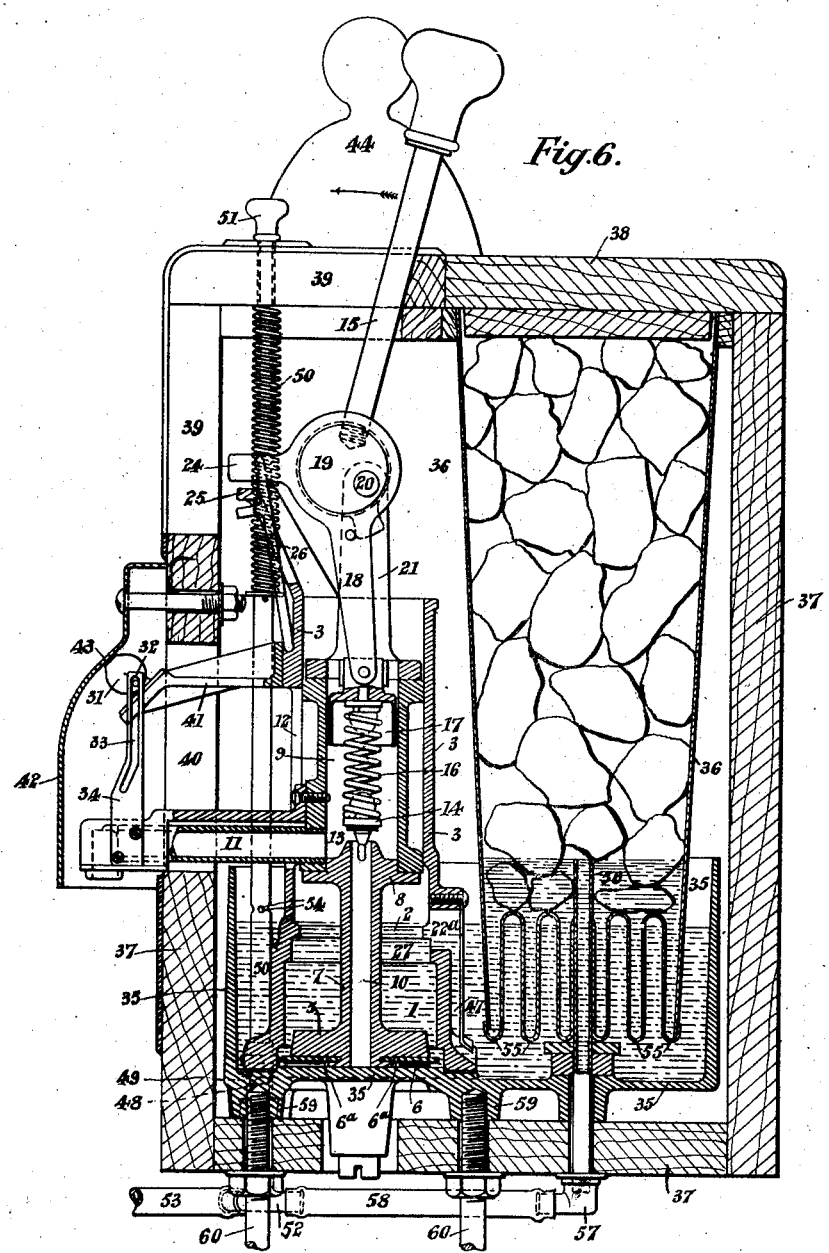

Patented Mar. 29, 1927.

1,623,011

UNITED STATES PATENT OFFICE.

WILLIAM HUCKS, OF CAMDEN TOWN, LONDON, ENGLAND, ASSIGNOR OF ONE-HALF TO SODASTREAM LIMITED, OF CAMDEN TOWN, ENGLAND.

APPARATUS FOR AERATING LIQUIDS.

Application filed July 14, 1926, Serial No. 122,440, and in Great Britain February 17, 1926.

This invention relates to apparatus for aerating water or other liquid in small quantities at a time, the said apparatus being of of the kind shewn and described in the specification of my prior Patent No. 229,733 and the patent of addition thereto. No. 242,044, which consisted in or comprised a receptacle for containing the water or other liquid (hereinafter referred to as liquid) to be aerated having a piston-like body reciprocable in the said receptacle, means for admitting gas under pressure into the said receptacle whereby the liquid therein is aerated a discharge outlet for the aerated liquid controlled by a spring pressed device adapted to act as a combined discharge valve and a safety valve and means actuated by a hand-lever for reciprocating the said piston-like body whereby movement of the said body in one direction effects the discharge of the said aerated liquid. In the said apparatus the receptacle (hereinafter referred to as the aerating receptacle) in which aeration of the liquid is effected is open at its bottom and liquid flows from a reservoir through the said open bottom into the said aerating receptacle so that under normal working conditions it is always charged with liquid.
This invention has for its object to provide an improved and simplified construction of apparatus of the aforesaid kind in which the aerating receptacle is closed at the bottom and open at the top so that the liquid to be aerated may be poured in at the said open top of the said receptacle by an operator as and when required for immediate aerating and discharge, but, if desired the said apparatus may be provided with a reservoir adapted to deliver into the said aerating receptacle at each operation of the apparatus, a quantity of liquid equivalent to that discharged.

Figure 3:
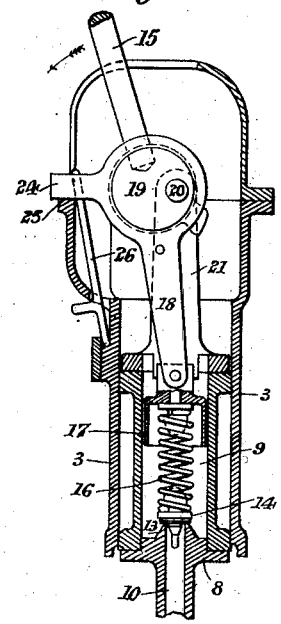
Figure 4:
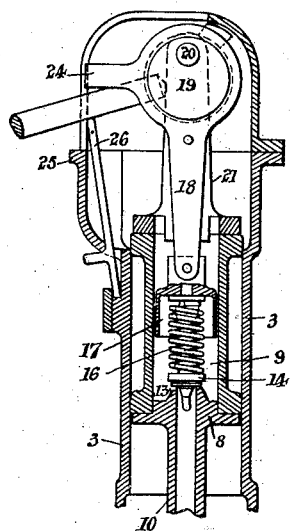

I will describe my invention with reference to the accompanying drawings in which Figures 1 and 2 shew in section at right angles to each other an apparatus for aerating liquids constructed in accordance with my invention. Figure 1ᵃ shews in elevation a detail hereinafter referred to. Figures 3 and 4 are sections shewing parts in different positions to that shewn in Figure 1, and Figures 5 and 6 shew in sections, at right angles to each other a modified construction of apparatus to that shewn in the said Figures 1 and 2.

Referring more particularly to Figures 1 and 2, the apparatus comprises a cylindrical aerating receptacle 1 which is closed at the bottom and has an inlet opening 2 at a suitable height from the said bottom through which the liquid is admitted into the said aerating receptacle. The aerating receptacle 1 is provided with an upwardly extending cylindrical part 3 which constitutes a housing for parts hereinafter described and the said receptacle is supported on and secured to a base-piece 4 which, in the example shewn constitutes a closure for the bottom of the said receptacle. The aerating receptacle 1 has a piston-like body reciprocal therein consisting of a plunger 5 which is smaller in diameter than the internal diameter of the part of the said receptacle in which the said plunger reciprocates, the space between being covered by a flexible valve 6 opening downwards as described in the specifications of our aforesaid patents. Extending upwardly from the plunger 5 is a stem 7 having a head 8 which constitutes a closure for the lower end of a discharge vessel 9 secured to the said head so that it reciprocates with the said plunger. Extending axially through the plunger 5, stem 7 and head 8 is a passage 10 through which the aerated liquid is expelled, upon the descent of the said plunger into the discharge vessel 9 from which it passes through an outlet spout 11 into a glass or other container placed in position to receive it. The discharge vessel 9 is housed and guided in the upward extending part 3 of the aerating receptacle 1 and the said part has a suitably shaped slot 12 formed therein through which the outlet spout 11 projects. The outlet 13 of the passage 10 is controlled by a combined discharge and safety valve 14 which is connected to an operating hand-lever 15 by means such that will permit the said valve to open the said outlet when a predetermined pressure is reached within the aerating receptacle 1 and will cause the said valve to open and close the said outlet at the proper times. This is shewn as being effected by attaching the valve 14 to the lower end of a spring 16 the upper end of which is attached to a slipper 17 slidable in the upper part of the discharge vessel 9 and pivotally connected to arms 18 of eccentric straps mounted on each side of an eccentric 19 on a shaft 20 rotatably carried in bearing brackets 21 secured to the upper end of the discharge vessel 9, to which eccentric the aforesaid operating hand-lever 15 is secured.

Presuming the plunger 5 to be bearing upon the flat bottom of the aerating receptacle 1 as shown in Figures 1 and 2 and that the said receptacle has been charged with liquid to be aerated (which may be poured in at either of the side charging openings 22 shewn provided with hinged covers 23) the operation of the apparatus is as follows:—Upon turning the hand-lever 15 in the direction of the arrow the eccentric 19 is turned on its shaft 20 and moves the eccentric strap arms 18 and the slipper 17 carried thereby downwardly (as shewn in Figure 3) thereby causing the combined discharge and safety valve 14 to be moved towards its seat until further downward movement of the said arms is prevented by projections 24 thereon engaging a fixed abutment which may conveniently be the upper end 25 of the extended part 3 of the aerating receptacle 1. As the arms 18 of the eccentric straps cannot now be moved downwardly further movement of the hand-lever 15 in the same direction turns the eccentric 19 in the said straps and raises the shaft 20 and consequently the discharge vessel 9 and the plunger 5 attached thereto are raised relatively to the combined discharge and safety valve 14 to close the outlet 13 of the passage 10 which closure is, however, not completely effected until the plunger 5 has been raised slightly from the bottom of the aerating receptacle 1 thereby overcoming suction effect which would occur if the said plunger were raised after ingress of air had been shut off by the closure of the said passage. To assist in overcoming the aforesaid suction effect the flexible valve 6 may have holes 5ᵃ through it. Further movement of the hand-lever 15 in the same direction brings it into contact with an abutment which is shewn as being constituted by a rocking-post 26 freely carried on the upper part 3 of the aerating receptacle 1 and when in this position the plunger 5 has been raised from the flat bottom 4 of the said aerating receptacle and the outlet 13 of the passage 10 has been moved up against the combined discharge and safety valve 14 thereby stopping further ingress of air through the said passage 10 to the underside of the plunger 5. Further pressure on the hand-lever 15 will now cause it to bear on the rocking-post 26 as a fulcrum and, through the eccentric 19, simultaneously compress the spring 16 and lift the discharge vessel 9 and all parts connected thereto including the combined discharge and safety valve 14 and plunger 5 until the said plunger is seated against an internal flange, or constriction, 27 at the upper end of the aerating receptacle 1. Gas under pressure is now admitted by a pipe 28 into a chamber 29 from which it passes, through a finely perforated tube 30 into the aerating receptacle 1 and the aeration of the liquid is effected, the pressure of the said gas acting upon the flexible valve 6 on the underside of the plunger 5 ensuring a gas-tight closure. Should the pressure in the aerating receptacle 1 exceed a predetermined amount the spring 16 of the combined discharge and safety valve 14 will yield sufficiently to allow the excess pressure to escape. Upon turning the hand-lever 15 in the reverse direction the eccentric 19 and the parts carried by the arms 18 of the eccentric strap will be moved in an upward direction and thereby permitting the spring 16 of the combined discharge and safety valve to extend sufficiently to permit of the escape of any gas that may not have been absorbed by the liquid and further movement of the said hand-lever in the same direction will lift the said valve off its seating to permit of the discharge of the said aerated liquid, which discharge is effected by applying a slight downward pressure, through the hand-lever 15 to the plunger 5 whereby the liquid beneath the said plunger is forced through the passage 10 into the discharge vessel 9 above from which it passes through the outlet spout 11 into a glass, or other container, placed in position to receive it.

If desired, a counting device may be provided to indicate the number of operations or the amount of liquid treated and drawn off, the said device being operated by any suitable moving part of the apparatus. This is shewn by way of example in Figure 1 as being effected by securing a counting device 31 to the exterior of the upwardly extending part 3 of the aerating receptacle 1, the said counting device having a cranked operating arm 32 which projects into the interior of the said part 3 and engages with a cam-shaped slot 33 in a plate 34 (shewn in elevation in Figure 1ᵃ) secured to the discharge vessel 9 so that at each upward, or downward, movement of the said discharge vessel the said counter will be operated.

Instead of charging the aerating receptacle 1 with liquid by pouring the said liquid as and when required into the said receptacle through one, or other, of the charging openings 22 as hereinbefore described with reference to Figures 1 and 2 the said receptacle may be charged from liquid contained in a reservoir and also if desired means may be provided for cooling the said liquid. This may be effected as shewn in Figures 5 and 6 wherein the aerating receptacle 1 instead of being secured to a base-piece 4 as hereinbefore described with reference to Figures 1 and 2 is secured to the bottom of a reservoir 35 for containing the liquid which enters the said aerating receptacle through an inlet opening 22ª formed in the side of the said receptacle. The reservoir 35 is provided with a tank 36 containing cooling medium, such for example as ice, which will act to cool the liquid in the said reservoir. In such apparatus it is preferred to enclose the whole in a box, or casing, 37 having a removable, or hinged, part 38 whereby access to the tank 36 and other parts of the apparatus may be had, suitable slots 39 and 40 being formed in the said box, or casing, through which the hand-lever 15 and outlet spout 11 respectively project. In this construction of apparatus the counting device 31 is carried by a bracket 41 secured, above the outlet spout 11, to the upwardly extending part 3 of the aerating receptacle 1, the crank operating arm 32 of the said counting device engaging a cam-shaped slot 33 in a plate 34 which in this example is secured to the said outlet spout so that each ascent, or descent, of the said spout would cause the said counting device to be actuated. If desired an open-bottom guard, such as that shewn at 42 in Figure 6, may be secured to the box, or casing, 37 to protect both the counting device and the outlet spout 11, a suitable aperture 43 being formed in the said guard through which the recording numerals of the said counting device can be seen.

The liquid to be aerated may be supplied to the reservoir 35 from an inverted bottle, or inverted bottles, 44 adapted to maintain the liquid in the said reservoir at a predetermined level as shewn and described in the specification of my before mentioned Letters Patent. The inverted bottles 44 are shewn supported in holders 45 secured to opposite sides of the box, or casing, 37 from which holders the liquid passes through inwardly projecting tubular extensions 46 formed on the lower part of the said holders into the reservoir 35 from which it passes into the aerating receptacle 1 through the inlet 22ª thereof. The inlet 22ª is preferably provided with means, such, for example, as a pipe, or as shewn in Figure 6 a covered channel 47 on the exterior of the aerating receptacle 1 which is adapted to ensure that only liquid that has passed to the bottom of the reservoir 35, and therefore has been subjected to the action of the cooling medium, is admitted into the said receptacle. The reservoir 35 may be provided with any suitable means for draining it; in Figure 6 an outflow orifice 48 is shewn formed in the bottom of the said reservoir for this purpose, the said orifice being normally closed by a hollow plug 49 on the end of a spring-pressed tube 50 which extends upwardly through the top of the box, or casing, 37 and is provided with a knob 51 by which it can be easily manipulated when required. A union 52 is shewn screwed into the outer end of the orifice 48 to which a flexible pipe 53 is attached for conveying the liquid discharged to any desired place. The spring-pressed tube 50 may be provided with overflow openings, or perforations, 54 through which liquid in the reservoir 35 can pass into the said tube and away through the hollow plug 49 to the flexible tube 53 should the liquid in the said reservoir exceed, at any time, a predetermined level.

The tank 36 containing the cooling medium (which we will presume to be ice) for cooling the liquid in the reservoir 35 is provided at its bottom with substantially deep corrugations 55 upon the upper ends of which the ice normally bears and as it melts the water descends between the said corrugations and acts to maintain the liquid in the said reservoir cool. The tank 36 is provided with an overflow pipe 56 the lower end of which passes through the said tank, bottom of the reservoir 35 and the box, or casing, 37 and has a union 57 screwed thereon which is connected by a flexible tube 58 to the union 52 so that when the water in the said tank exceeds a predetermined level it will overflow into the said pipe and pass away by the pipe 53 to any desired place.

The reservoir 35 may be secured to the bottom of the box or casing 37 in any suitable manner, for example this may be effected by providing the underside of the said reservoir with bosses 59 which bear on the bottom of the said box, or casing, and screwing bolts 60 through the said bottom into the said bosses.

In the apparatus shewn in Figures 5 and 6 the parts that are similar to those in the apparatus shewn in Figures 1 and 2 are marked with like numerals of reference and as they operate in precisely the same manner no further description is necessary.

What I claim is:—

1. Apparatus for use in aerating liquids, the said apparatus consisting in, or comprising, an aerating receptacle closed at the bottom and having an inlet opening, or openings, at a suitable height from the said bottom, through which liquid to be aerated is admitted to the said receptacle, a piston-like body reciprocal within the said aerating receptacle and having an axial passage therethrough, a discharge vessel secured to and reciprocal with the said piston-like body, a combined discharge and safety valve situated in the said discharge vessel and adapted to control the outlet of the said axial passage, means for admitting gas under pressure into the said aerating receptacle, and hand-operable means adapted to cause, at the proper times, the said piston-like body to ascend through the liquid in the said aerating receptacle and close the upper end thereof, and the said combined discharge and safety valve to close the outlet of the axial passage through the said piston-like body, and after aeration of the liquid confined in the said aerating receptacle has been effected, to cause the said combined discharge and safety valve to open the outlet of the said axial passage, and cause, or permit, the said piston-like body to descend and expel the aerated liquid through the said axial passage into the said discharge vessel from which it passes through an outlet spout into a receptacle placed in position to receive it; substantially as hereinbefore described.

2. In apparatus for use in aerating liquids as claimed in the preceding claiming clause hand operable means adapted, when moved in one direction, to first move the combined discharge and safety valve downwardly towards its seating, then to move the piston-like body and the discharge vessel attached thereto upwardly relatively to the said combined discharge and safety valve to effect the closure of the outlet end of the axial passage through the said piston-like body and afterwards to simultaneously move the aforesaid parts upwardly and when moved in the reverse direction to first permit the said combined discharge and safety valve to move upwardly off its seating and then to simultaneously move the aforesaid parts downwardly, or permit the said parts to simultaneously move downwardly; substantially as, and for the purpose, hereinbefore described.

3. In apparatus for use in aerating liquids as claimed in the preceding claiming clause 1, the aerating receptacle provided with an extension adapted to constitute a guide and housing for the discharge vessel and the hand-operable means by which the said discharge vessel and the piston-like body are reciprocated, and the combined discharge and safety valve is moved onto and off its seating, and having a slot, or opening, through which the outlet spout of the said discharge vessel projects and slides; substantially as hereinbefore described.

4. In apparatus for use in aerating liquids as claimed in the preceding claiming clause 1, means for carrying the combined discharge and safety valve and for moving it onto and off its seating and for raising the piston-like body and the discharge vessel attached thereto, the said means consisting in, or comprising, a shaft, or spindle, mounted in standards secured to the said discharge vessel, an eccentric on the said shaft, or spindle, and rotatable to a limited extent by a hand-lever, eccentric straps on the said eccentric, provided with means for limiting their downward movement, a slipper, or cross-head, pivotally connected to the lower ends of the said straps and having the combined discharge and safety valve flexibly connected thereto and means, constituting a fulcrum, for the said hand-lever whereby at the proper time the said hand-lever acts to simultaneously raise the aforesaid parts; substantially as hereinbefore described.

5. The combination with apparatus for use in aerating liquids as claimed in the preceding claiming clause 1, of a reservoir for containing liquid to be aerated, means for supplying liquid to the said reservoir and maintaining the said liquid at a predetermined level, a tank within the said reservoir containing a cooling medium whereby the liquid in the said reservoir is cooled, and means for admitting liquid from the said reservoir into the aerating receptacle, the said means being such as will ensure that only liquid that has passed to the bottom of the reservoir is admitted into the said aerating receptacle; substantially as hereinbefore described.

In testimony whereof I have signed my name to this specification.

WILLIAM HUCKS.